(12) United States Patent
Kang et al.

(10) Patent No.: US 10,546,201 B2
(45) Date of Patent: Jan. 28, 2020

(54) METHOD AND APPARATUS FOR DETERMINING ABNORMAL OBJECT

(71) Applicant: SAMSUNG ELECTRONICS CO., LTD., Suwon-si (KR)

(72) Inventors: Hyoa Kang, Seoul (KR); Changhyun Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/583,339

(22) Filed: May 1, 2017

(65) Prior Publication Data

US 2018/0150701 A1 May 31, 2018

(30) Foreign Application Priority Data

Nov. 29, 2016 (KR) ........................ 10-2016-0160677

(51) Int. Cl.
*G06K 9/00* (2006.01)
*G06K 9/78* (2006.01)
(Continued)

(52) U.S. Cl.
CPC ..... *G06K 9/00805* (2013.01); *G06K 9/00201* (2013.01); *G06K 9/00798* (2013.01); *G06K 9/78* (2013.01); *G06N 3/08* (2013.01); *G08G 1/167* (2013.01); *G06T 2207/30252* (2013.01); *G06T 2207/30256* (2013.01); *G06T 2207/30261* (2013.01)

(58) Field of Classification Search
CPC .... G08G 1/166; G08G 1/167; G06K 9/00201;
G06K 9/00798; G06K 9/00805; G06K 9/4623; G06K 9/627; G06K 9/78; G06T 2207/30252; G06T 2207/30256; G06T 2207/30261; G06N 3/04; G06N 3/08; G06N 3/126; G06N 5/003; G06N 20/10
See application file for complete search history.

(56) References Cited

U.S. PATENT DOCUMENTS 7,607,509 B2 10/2009 Schmiz et al.
7,848,566 B2 12/2010 Schneiderman
(Continued)

FOREIGN PATENT DOCUMENTS

KR 10-0862398 B1 10/2008
KR 10-2014-0145481 A 12/2014
KR 10-1480992 B1 1/2015

OTHER PUBLICATIONS

Nashashibi et al. "Laser-based vehicles tracking and classification using occlusion reasoning and confidence estimation." 2008 IEEE Intelligent Vehicles Symposium. IEEE, 2008. (Year: 2008).*

*Primary Examiner* — Katrina R Fujita
(74) *Attorney, Agent, or Firm* — Sughrue Mion, PLLC

(57) ABSTRACT

Disclosed is a method and apparatus for determining an abnormal object, the method including selecting a candidate object from target objects extracted from a two-dimensional (2D) image of a front view captured from a host vehicle, generating a three-dimensional (3D) model of the candidate object, determining, based on the 3D model, whether the candidate object corresponds to an abnormal object that interferes with driving of the host vehicle, and outputting the abnormal object, in response to the candidate object corresponding to the abnormal object.

18 Claims, 9 Drawing Sheets

(51) Int. Cl.
    *G06N 3/08*           (2006.01)
    *G08G 1/16*           (2006.01)

(56) References Cited

U.S. PATENT DOCUMENTS

| | | | |
|---|---|---|---|
| 8,369,575 | B2 | 2/2013 | Kim |
| 8,437,544 | B2 | 5/2013 | Boncyk et al. |
| 8,861,842 | B2 | 10/2014 | Jung et al. |
| 9,171,213 | B2 | 10/2015 | Bulan et al. |
| 9,199,641 | B2 | 12/2015 | Ferguson et al. |
| 9,224,053 | B1 | 12/2015 | Ferguson et al. |
| 9,235,988 | B2 | 1/2016 | Mimeault et al. |
| 9,555,803 | B2 * | 1/2017 | Pawlicki ............ B60K 31/0008 |
| 9,889,858 | B2 * | 2/2018 | Schmudderich .. B60W 50/0097 |
| 2004/0243292 | A1 * | 12/2004 | Roy ...................... B60W 50/06 |
| | | | 701/36 |
| 2009/0060273 | A1 | 3/2009 | Stephan et al. |
| 2009/0228204 | A1 | 9/2009 | Zavoli et al. |
| 2013/0335569 | A1 * | 12/2013 | Einecke ................ G01S 13/867 |
| | | | 348/148 |
| 2014/0236414 | A1 * | 8/2014 | Droz ...................... G08G 1/161 |
| | | | 701/28 |
| 2016/0196654 | A1 * | 7/2016 | Aoki ........................ G06T 7/73 |
| | | | 382/103 |
| 2016/0257308 | A1 * | 9/2016 | Pawlicki ............ B60K 31/0008 |
| 2017/0206426 | A1 * | 7/2017 | Schrier ................ G05D 1/0088 |
| 2017/0213149 | A1 * | 7/2017 | Micks .................... B60W 30/09 |
| 2017/0220874 | A1 * | 8/2017 | Ayvaci ...................... G06T 7/13 |
| 2017/0369051 | A1 * | 12/2017 | Sakai .................... B60W 30/09 |

* cited by examiner

METHOD AND APPARATUS FOR DETERMINING ABNORMAL OBJECT

CROSS-REFERENCE TO RELATED APPLICATIONS

This application claims the benefit under 35 USC § 119(a) of Korean Patent Application No. 10-2016-0160677 filed on Nov. 29, 2016, in the Korean Intellectual Property Office, the entire disclosure of which is incorporated herein by reference for all purposes.

BACKGROUND

1. Field

The following description relates to a method and apparatus for determining an abnormal object.

2. Description of Related Art

Due to an increase in the number of vehicles being driven, there has been an increase in the number of vehicular accidents. To prevent accidents, interests in safe driving technology have increased. Various methods of determining an abnormal object that may interfere with a driving of a vehicle have been proposed. Some of these methods are based on an image of a front view captured from the vehicle. However, due to a large amount of operation performed to determine the abnormal object, it is difficult to ensure an optimum performance at a high accuracy or determining the abnormal object in real time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided method of determining an abnormal object, the method including selecting a candidate object from target objects extracted from a two-dimensional (2D) image of a front view captured from a host vehicle, generating a three-dimensional (3D) model of the candidate object, determining, based on the 3D model, whether the candidate object corresponds to an abnormal object that interferes with driving of the host vehicle, and outputting the abnormal object, in response to the candidate object corresponding to the abnormal object.

In response to the target objects traveling in a same lane as the host vehicle, the selecting of the candidate object may include selecting the candidate object from the target objects based on portions of the target objects not occluded by another vehicle in the 2D image.

The selecting of the candidate object may include selecting a target object of the target objects as the candidate object in response to a difference in portion of the target object not occluded by another vehicle in the 2D image and the portion of the other target objects that is not occluded by other vehicles being greater than or equal to a threshold.

The selecting of the candidate object may include selecting the candidate object from the target objects based on any one or any combination of a degree of curve of the lane, a distance from the host vehicle, and types of the nearby vehicles.

The selecting of the candidate object may include selecting the candidate object from the target objects using a neural network trained to output a candidate object in response to an input of the 2D image.

The neural network may be adaptively trained based the determining of whether the candidate object corresponds to the abnormal object.

The selecting of the candidate object may include selecting the candidate object from the target objects based on an abnormal score from a previous image captured earlier than the 2D image, and the abnormal score may determine whether a target object corresponds to the abnormal object.

The selecting of the candidate object may include selecting the candidate object from the target objects based on driving patterns of the target objects acquired from the 2D image and a previous image captured earlier than the 2D image.

The determining of whether the candidate object corresponds to the abnormal object may include determining whether the candidate object corresponds to the abnormal object based on any one or any combination of whether the candidate object is travelling in a lane identical or adjacent to that of the host vehicle, a moving direction, a moving speed, a distance from the host vehicle, and a size of the candidate object.

The determining of whether the candidate object corresponds to the abnormal object may include determining whether the candidate object corresponds to the abnormal object based any one or any combination of a shape of a road on which the host vehicle is travelling, a traffic accident frequency, a traffic condition, and a driving pattern of a user of the host vehicle.

In response to the candidate object being a person, the determining of whether the candidate object corresponds to the abnormal object may include determining whether the candidate object corresponds to the abnormal object using any one or any combination of a moving direction, a moving speed, a distance from the host vehicle, a pose, a direction of a face, and a height of the person.

The outputting of the abnormal object may include any one or any combination of displaying the abnormal object on a display device in the host vehicle, replaying a warning sound indicating a presence of the abnormal object through a speaker device in the host vehicle, delivering tactile feedback on the abnormal object by a steering handle of the host vehicle, delivering information on the abnormal object by a vibration of a seat of the host vehicle, and providing the abnormal object to a driving system that controls or guides the driving of the host vehicle.

The selecting of the candidate object may include selecting a target object travelling in a pattern different than the remaining target objects.

In another general aspect, there is provided an apparatus for determining an abnormal object, the apparatus including an image sensor configured to capture a front image from a host vehicle and to generate a two-dimensional (2D) image, and a processor configured to select a candidate object from target objects extracted from the 2D image, generate a 3D model of the candidate object, determine, based on the 3D model, whether the candidate object corresponds to an abnormal object that interferes with driving of the host vehicle, and output the abnormal object, in response to the candidate object corresponding to the abnormal object.

In response to the target objects traveling in a same lane as the host vehicle, the processor may be configured to select the candidate object from the target objects based on portions of the target objects not occluded by another vehicle in the 2D image.

The processor may be configured to select the candidate object from the target objects using a neural network trained to output a candidate object in response to an input of the 2D image.

The neural network may be adaptively trained based a determination of whether the candidate object corresponds to the abnormal object.

The processor may be configured to select the candidate object from the target objects based on an abnormal score from a previous image captured earlier than the 2D image, and the abnormal score determines whether a target object corresponds to the abnormal object.

The processor may be configured to determine whether the candidate object corresponds to the abnormal object based on any one or any combination of whether the candidate object is travelling in a lane identical or adjacent to that of the host vehicle, a moving direction, a moving speed, a distance from the host vehicle, and a size of the candidate object.

The processor may be configured to determine whether the candidate object corresponds to the abnormal object based on any one or any combination of a shape of a road on which the host vehicle is travelling, a traffic accident frequency, a traffic condition, and a driving pattern of a user of the host vehicle.

Other features and aspects will be apparent from the following detailed description, the drawings, and the claims.

Figure 1:
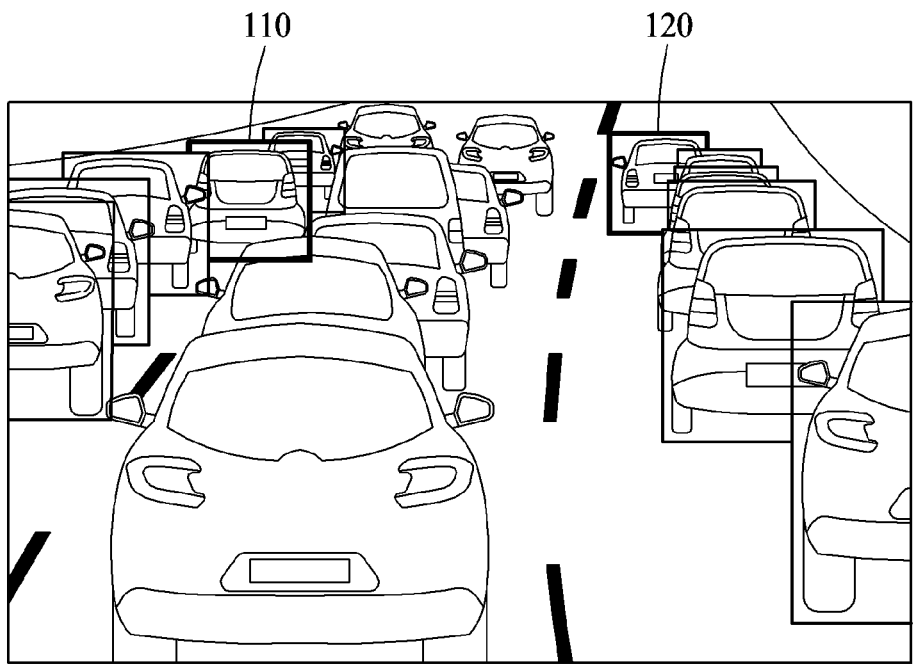
FIG. 1 illustrates an example of determining an abnormal object that is to interfere with driving.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

In an example, the following embodiments are applied to determine an abnormal object that may interfere with driving a vehicle. The method and apparatus for determining abnormal objects may be implemented as or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent automobile, and an autonomous driving vehicle including a camera, a vision sensor, or an ultrasonic sensor.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses.

FIG. 1 illustrates an example of determining an abnormal object that is to interfere with driving.

A two-dimensional (2D) image of a front view captured from a host vehicle is illustrated in FIG. 1.

In an example, the 2D image is captured by an image sensor mounted on or included in the host vehicle. The 2D image includes vehicles travelling in front of the host vehicle. Hereinafter, a vehicle travelling nearby the host vehicle is referred to as a nearby vehicle. When a vehicle that interferes with a driving of the host vehicle is included in the nearby vehicles, the vehicle is determined to be an abnormal object and information on the vehicle is delivered to a driving system of the host vehicle to protect an occupant of the host vehicle.

In an example, the abnormal object is a vehicle that interferes with the driving of the host vehicle and has a driving pattern that differs from that of another vehicle travelling normally. The abnormal object is predicted to affect the driving of the host vehicle in a foreseeable future. In an example, the abnormal object is a vehicle that is predicted to come in front of the host vehicle, a vehicle that is predicted to abruptly stop in front of the host vehicle, or a vehicle that rushes towards the host vehicle over a centerline.

By building a three-dimensional (3D) model of the nearby vehicles, the vehicle that interferes with the driving of the host vehicle is detected with a high accuracy. Due to a large amount of calculations for building the 3D model, it is difficult to build the 3D model for every nearby vehicle included in the 2D image. Thus, a candidate object is selected to determine whether the candidate object corresponds to the abnormal object.

The nearby vehicles included in the 2D image are extracted as target objects. A candidate object that may interfere with the driving of the host vehicle may be selected from the extracted target objects. By generating the 3D model for only the candidate object, efficient determination is made whether the candidate object corresponds to the abnormal object.

Although FIG. 1 illustrates an example of determining whether an abnormal object is present in left and right lanes of a lane in which a host vehicle is travelling, the description is also applicable to the lane in which the host vehicle is travelling. Since each of the nearby vehicles included in the 2D image is extracted as a target object, a term of the nearby vehicle and a term of the target object may be used interchangeably.

Referring to FIG. 1, nearby vehicles travelling in the left and right lanes are extracted as target objects as indicated by boxes 110 and 120. In FIG. 1, candidate objects 110 and 120 are travelling in a pattern that is different from that of other vehicles and are likely to interfere with a driving of a host vehicle. Thus, the candidate objects 110 and 120 are selected based on information represented in a 2D image. 3D information on the candidate objects 110 and 120 are estimated, and 3D models of the candidate objects 110 and 120 are generated based on the estimated 3D information. Using the 3D models, a determination is made whether the candidate objects 110 and 120 correspond to the abnormal object, and a determined abnormal object is output.

By generating a 3D model for only an object selected as a candidate object from target objects extracted from a 2D image, an amount of operations performed to determine an abnormal object is effectively reduced.

Figure 2:
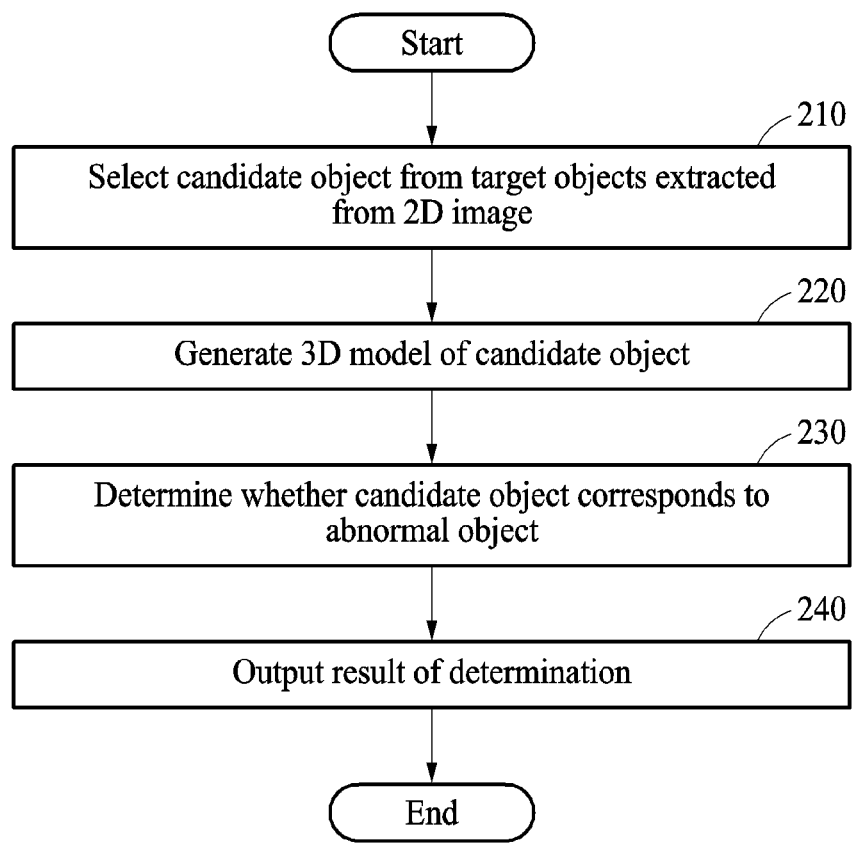
FIG. 2 illustrates an example of a method of determining an abnormal object.

FIG. 2 illustrates an example of a method of determining an abnormal object. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In an example, the method of determining an abnormal object is performed by a processor included in an apparatus for determining an abnormal object. In addition to the description of FIG. 2 below, the above descriptions of FIG. 1 is also applicable to FIG. 2, and are incorporated herein by reference. Thus, the above description may not be repeated here.

In 210, the abnormal object determining apparatus selects a candidate object that may interfere with a driving of a host vehicle from target objects extracted from a 2D image of a front view captured from the host vehicle.

When nearby vehicles that are travelling in the same lane as that of the host vehicle are extracted as the target objects, the nearby vehicles are each occluded by another vehicle in the 2D image. In a case of nearby vehicles normally travelling in the same lane, the nearby vehicles may have similar proportions of a portion not occluded by another vehicle in the 2D image.

The abnormal object determining apparatus selects the candidate object from the target objects based on portions of the candidate object not occluded by nearby vehicles in the 2D image. In an example, the abnormal object determining apparatus selects a nearby vehicle to be the candidate object when a difference in portion of the candidate that is not occluded by another vehicle in the 2D image and the portion of the other nearby vehicle that is not occluded by other vehicles is greater than or equal to a threshold. Hereinafter, the proportion of the portion not occluded by the other vehicle is also referred to as an exposure proportion.

In an example, when nearby vehicles A, B, C, D, and E are present, and the exposure proportion of the nearby vehicle B is 50% and exposure proportions of the nearby vehicles A, C, D, and E are 10 to 15%, and the threshold of the difference in exposure proportion is 30%. A difference in exposure proportion between the nearby vehicle B and the A, C, D, and E is greater than or equal to a threshold, thus, the abnormal object determining apparatus selects the nearby vehicle B as the candidate object.

The proportion of the portion not occluded by the other vehicle varies based on factors such as, for example, a degree of curve of a lane, a distance from the host vehicle, and a type of the nearby vehicle, such as, for example, a sedan, a minivan, a sports utility vehicle (SUV), a wagon, and a bus.

When the distance from the host vehicle increases, the proportion of the portion not occluded by the other vehicle is reduced. When the lane is curved, the proportion of the portion not occluded by the other vehicle may be reduced more gradually as the distance from the host vehicle increases as compared to a straight lane. Also, a proportion of a portion of a sedan occluded by a minivan may be greater than a proportion of a portion of the minivan occluded by the sedan.

In an example, the abnormal object determining apparatus takes into account one of the degree of curve of the lane, the distance from the host vehicle, or the type of the nearby vehicle when selecting the candidate object from the target objects.

The abnormal object determining apparatus selects the candidate object using a neural network trained to output the candidate object in response to an input of the 2D image. Training of the neural network is understood as determining a parameter of a weight value of the neural network.

In training the neural network, a whole or part of the 2D image, a box of the target object, a class of the target object, such as, for example, a vehicle or a person, and whether the target object is abnormal may be used as learning data. By using the trained neural network, the abnormal object determining apparatus extracts the target objects from the 2D image and selects the candidate object from the extracted target objects. The neural network used to extract the target objects from the 2D image and the neural network used to select the candidate object may be an integrated neural network or separate neural networks.

The neural network selects the candidate object from the target objects extracted from the 2D image and outputs a result of the selecting using an objectness map. In an example, the objectness map represents a probability that the candidate object is present for each pixel of the 2D image. When the probability exceeds a threshold probability, the abnormal object determining apparatus determines that the candidate object is present in the corresponding position.

In an example, the neural network uses the whole or part of the 2D image and the objectness map representing the candidate object included in 2D image as the learning data.

In an example, the neural network may be a deep neural network such as, for example, a convolutional neural network (CNN), a recurrent neural network (RNN), and a deep belief network (DBN). In an example, the neural network is trained based on various methods such as, for example, stochastic gradient descent, adaptive moment estimation (Adam), and root mean square propagation (RMSprop).

In 220, the abnormal object determining apparatus estimates 3D information on the candidate object and generates a 3D model of the candidate object.

The abnormal object determining apparatus selectively generates the 3D model for the candidate object. Based on the 3D information of the candidate object, the abnormal object determining apparatus obtains distances, for example, depth values, from points configuring a portion of the candidate object not occluded by another vehicle in the 2D image. In an example, the abnormal object determining apparatus estimates a moving direction of the candidate object, for example, a heading angle of a vehicle, a moving speed of the candidate object, a size of the candidate object, or a distance from the host vehicle using distances from the points to a general template for a vehicle.

In 230, the abnormal object determining apparatus determines whether the candidate object corresponds to an abnormal object that interferes with the driving of the host vehicle, based on the 3D model.

The abnormal object determining apparatus calculates an abnormal score of the candidate object based on the 3D model. When the abnormal score is greater than a threshold score, the abnormal object determining apparatus determines that the candidate object corresponds to the abnormal object.

The abnormal score is a score calculated to determine whether the candidate object corresponds to the abnormal object. In an example, the abnormal score is an index indicating an abnormal driving of the candidate object.

The abnormal object determining apparatus determines whether the candidate object corresponds to the abnormal objects using at least one of the moving direction of the candidate object, the moving speed of the candidate object, the size of the candidate object, the distance from the host vehicle, or whether the candidate object is travelling in a lane identical or adjacent to that of the host vehicle. In an example, the abnormal object determining apparatus calculates the abnormal score of the candidate object using at least one of the moving direction of the candidate object, the moving speed of the candidate object, the size of the candidate object, the distance from the host vehicle, or whether the candidate object is travelling in a lane identical or adjacent to that of the host vehicle.

For example, when it is determined that the moving direction of the candidate object crosses with a moving direction of the host vehicle, the abnormal object determining apparatus determines a relatively high abnormal score for the candidate object.

In an example, the abnormal object determining apparatus increases the abnormal score of the candidate object as the moving speed of the candidate object increases. When the candidate object located is in front of the host vehicle is significantly slower than the host vehicle, a collision between the host vehicle and the candidate object may be predicted, thus, the abnormal object determining apparatus determines a relatively high abnormal score for the candidate object. In an example, when the moving direction of the host vehicle does not cross with the moving direction of the host vehicle, the moving speed of the candidate object may not be taken into consideration.

In an example, the abnormal object determining apparatus increases the abnormal score of the candidate object as the distance from the host vehicle decreases. In an example, the abnormal object determining apparatus assigns a higher abnormal score to a candidate object travelling in the same lane when compared to a candidate object traveling in an adjacent lane.

In an example, the abnormal object determining apparatus determines whether the candidate object corresponds to the abnormal object based on at least one of a shape of a road on which the host vehicle is travelling, a traffic accident frequency, a traffic condition, or a driving pattern of a user of the host vehicle. In an example, the abnormal object determining apparatus determines a threshold score corresponding to a reference for determining the abnormal object using at least one of the shape of the road on which the host vehicle is travelling, the traffic accident frequency, the traffic condition, or the driving pattern of the user of the host vehicle.

When the road on which the host vehicle is travelling includes adverse conditions, such as, for example, a sharp curve, a steep slope, a tunnel, a bridge, or an unpaved road, the abnormal object determining apparatus determines a lower threshold score as compared to a straight road. In an example, when the host vehicle is travelling a road with a high accident frequency, the abnormal object determining apparatus determines a lower threshold score as compared to a road with a low accident frequency. In an example, when traffic is stagnated due to an accident or a construction on the road on which the host vehicle is travelling, the abnormal object determining apparatus determines a lower threshold score as compared to a normal traffic condition. In an example, when the user drives the host vehicle in an abnormal driving pattern such as, for example, a sudden stop, a sudden start, a zig-zag route, and a rough driving, the abnormal object determining apparatus determines a lower threshold score as compared to a normal driving pattern.

By lowering the threshold score in certain situations, the abnormal object determining apparatus may effectively induce the user of the host vehicle to pay more attention to the driving.

The abnormal object determining apparatus determines whether the candidate object corresponds to the abnormal object taking the aforementioned factors into consideration, and using a regression model, a machine learning scheme such as support vector machines (SVM), a decision tree, and a genetic algorithm, or a deep neural network such as a CNN, an RNN, and a DBN.

The abnormal object determining apparatus determines whether the candidate object corresponds to the abnormal object using the neural network trained to output the abnormal object based on a value estimated from the 3D model, for example, the moving direction of the candidate object, the moving speed, the size, the distance from the host vehicle, and whether the candidate object is travelling in a lane identical or adjacent to that of the host vehicle. The neural network may also be trained further based on the shape of the road, the previous accident frequency, the traffic condition, and the driving pattern of the user of the host vehicle.

In 240, the abnormal object determining apparatus outputs a result of the determination, in response to a determination that the candidate object corresponds to the abnormal object.

The abnormal object determining apparatus displays the abnormal object on a display included in the host vehicle, plays a warning auditory information indicating a presence of the abnormal object using an audio system in the vehicle, displays the warning using visual information on a display in the vehicle, provides the warning using tactile information delivered by a steering handle of the vehicle, or a vibration of a passenger seat, or delivers information on the abnormal object to a driving system that controls or guides the driving of the host vehicle.

Figure 3:
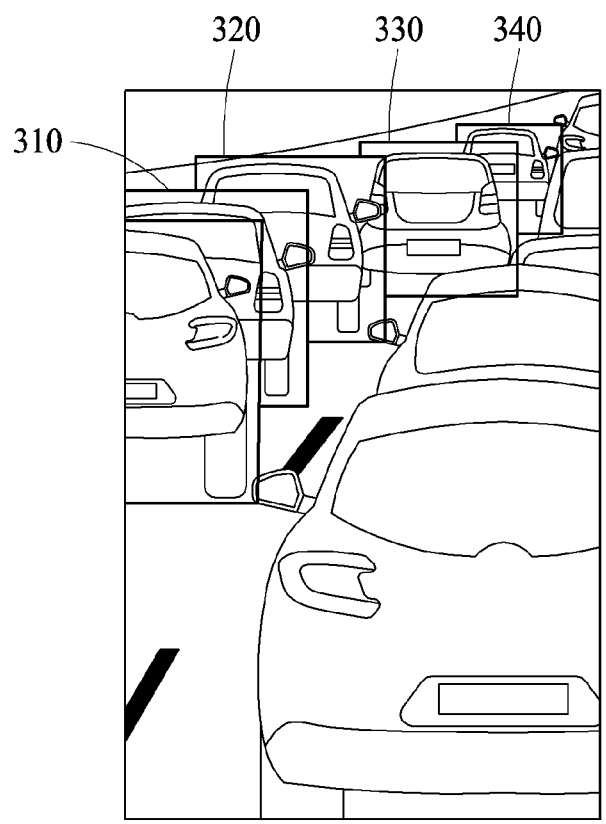
FIGS. 3-5 illustrate examples of selecting a candidate object from target objects.
Figure 4:
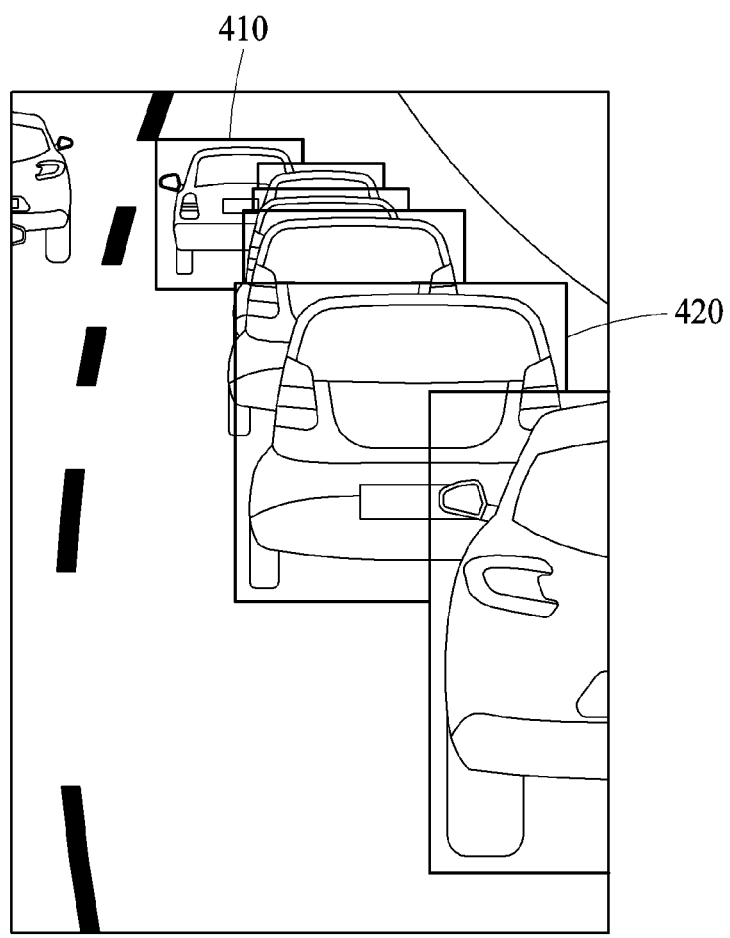
Figure 5:
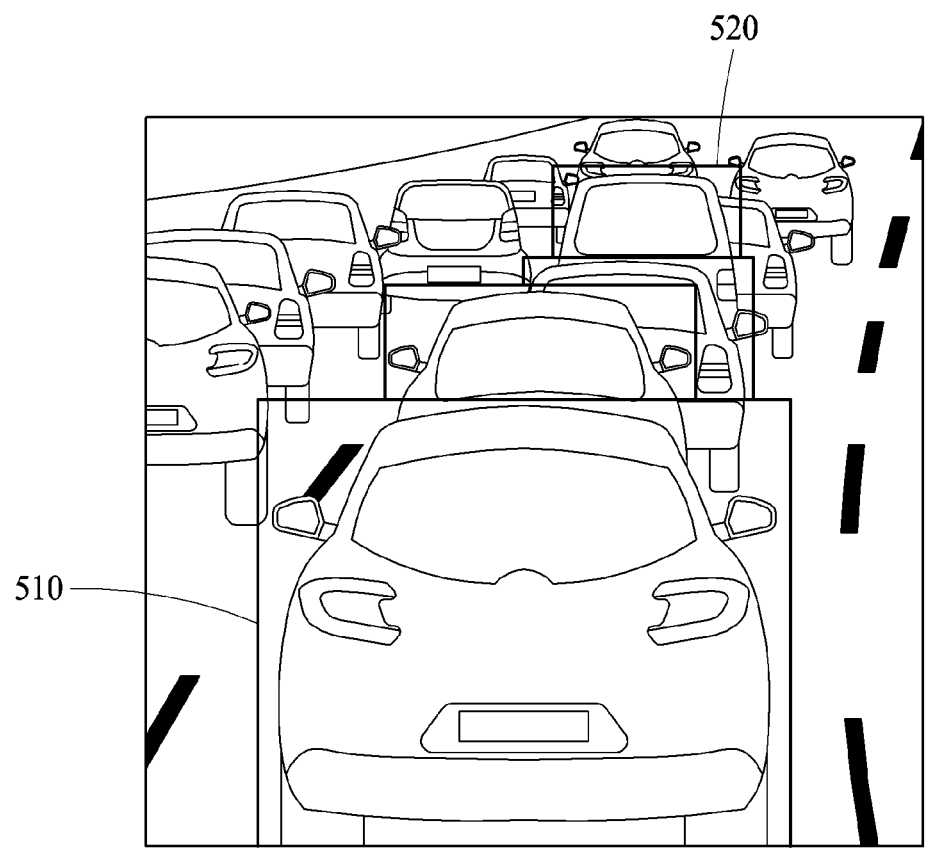

FIGS. 3 to 5 illustrate examples of selecting a candidate object from target objects.

FIG. 3 illustrates an example of selecting a candidate object from target objects based on unoccluded portions of nearby vehicles.

In FIG. 3, target objects are nearby vehicles travelling in the same lane, and target objects extracted from a 2D image are indicated by boxes 310, 320, 330, and 340. When nearby vehicles travel in the same lane, the nearby vehicles may have similar proportions of a portion not occluded by another vehicle in the 2D image. When a nearby vehicle travels in a pattern different from those of other vehicles, a difference in portion not occluded by another vehicle in the 2D image between the nearby vehicle and the other vehicles may be greater than or equal to a threshold. The abnormal object determining apparatus determines the nearby vehicle having the proportion greater than or equal to the threshold, to be a candidate object.

Referring to FIG. 3, exposure proportions of a first target object 310, a second target object 320, and a fourth target object 340 are each less than half while an exposure proportion of a third target object 330 is greater than half. The exposure proportion of the third target object 330 is different from the exposure proportions in the first target object 310, the second target object 320, and the fourth target object 340. In this example, the abnormal object determining apparatus selects the third target object 330 to be the candidate object.

FIG. 4 illustrates an example of selecting a candidate object further based on a previous image captured at an earlier point in time.

When selecting the candidate object, a fifth target object 410 and a sixth target object 420 are to be selected in an example of FIG. 4.

In an example, the abnormal object determining apparatus selects the candidate object from target objects based on an abnormal score determined in a previous image captured at a point in time before that of a 2D image. For example, when a score of the sixth target object 420 determined in the previous image is low, the sixth target object 420 may not be determined to be the abnormal object in the previous image. The abnormal object determining apparatus may not select the sixth target object 420 in the 2D image in consideration of the low score.

Since the abnormal score is calculated for the selected candidate object, the abnormal score is not calculated for a target object not selected as the candidate object in the previous image. Thus, an abnormal score of the corresponding target object is set to be zero. When the abnormal score calculated in the previous image is greater than a threshold score, the target object is determined to be the abnormal object. In an example, the abnormal object determining apparatus selects the target object as the candidate object at a probability higher than those of other objects in consideration of the abnormal score calculated in the previous image.

The neural network selects the candidate object based on a box indicating the abnormal object determined in the previous image, the abnormal score, and a 2D image at a current point in time. In an example, the neural network selects the candidate object using the 2D image at the current point in time, and an objectness map indicating a probability of the abnormal object determined in the previous image and the abnormal score by applying a weight thereto.

The abnormal object determining apparatus selects the candidate object from the target objects using the previous image and the 2D image. In an example, the abnormal object determining apparatus acquires driving patterns of the target objects using the previous image and the 2D image and selects the candidate object from the target objects based on the driving patterns.

For example, when a nearby vehicle that is travelling in a pattern different from those of other vehicles in the 2D image captured at the current point in time has traveled in the same pattern in the previous image. The abnormal object determining apparatus does not select the nearby vehicle as the candidate object in consideration of the pattern of the nearby vehicle.

The prior point in time may a point in time earlier than the current point in time at which the 2D image is captured.

FIG. 5 illustrates an example of selecting a candidate object from target objects extracted from a 2D image further based on a distance from a host vehicle and types of nearby vehicles.

Each of the nearby vehicles included in the 2D image is extracted as a target object as indicated by a box. An abnormal object determining apparatus estimates a distance from the host vehicle to the corresponding nearby vehicle based on a size of the box and selects a candidate object based on the estimated distance.

A nearby vehicle located closer to the host vehicle may interfere with a driving of the host vehicle as compared to a nearby vehicle located farther from the host vehicle. When the close host vehicle actually interferes with the driving, a quick response is required. The abnormal object determining apparatus selects the candidate object further based on the distance from the host vehicle which is determined based on the size of the box indicating the target object.

In FIG. 5, a seventh target object 510 is located closest to the host vehicle. The abnormal object determining apparatus recognizes that the seventh target object 510 is located closest to the host vehicle based on a size of a box indicating the seventh target object 510 and thus, selects the seventh target object 510 as the candidate object.

A proportion of a portion of a sedan occluded by a minivan may be greater than a proportion of a portion of the minivan occluded by the sedan. Despite a difference in exposure proportion between the nearby vehicle and other vehicles being greater than or equal to a threshold, the abnormal object determining apparatus does not select the nearby vehicle as the candidate object in consideration of a type of the nearby vehicle.

In an example of FIG. 5, an eighth target object 520 is a minivan and a vehicle obstructing the eighth target object 520 is a sedan. In this example, despite a difference in exposure proportion between the eighth target object 520 and other vehicles greater than or equal to a threshold, the abnormal object determining apparatus does not select the eighth target object 520 as the candidate object because of a type of the eighth target object 520.

Figure 6:
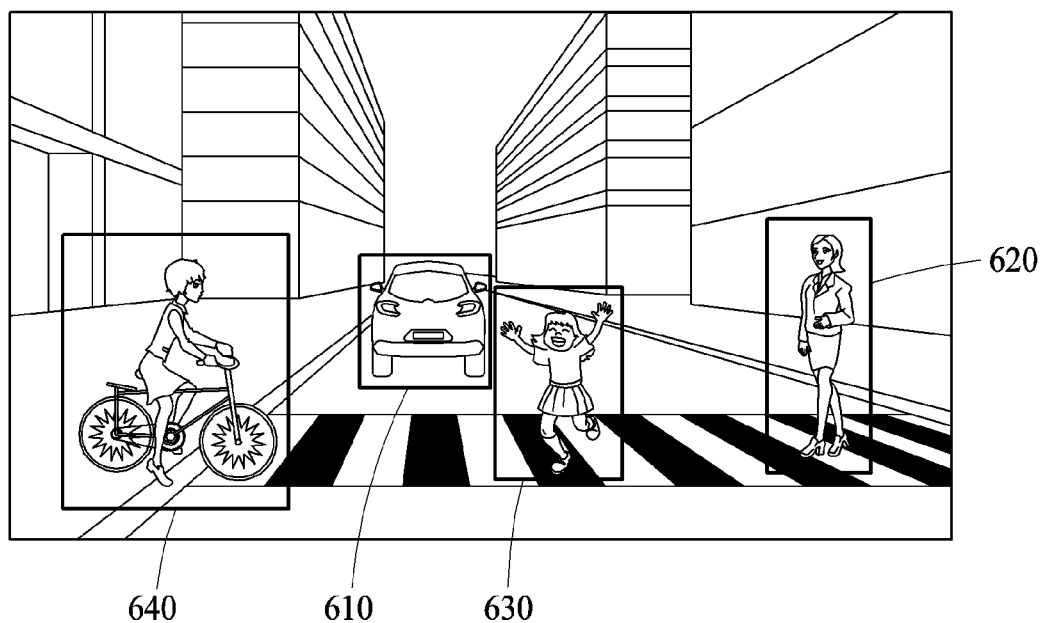
FIG. 6 illustrates an example of determining an abnormal object when a candidate object is a person.

FIG. 6 illustrates an example of determining an abnormal object when a candidate object is a person.

FIG. 6 illustrates an example of determining an abnormal object when a person, for example, a pedestrian is present in front of a host vehicle.

A nearby vehicle 610 and persons are located in front of a host vehicle, and in an example, one of the persons may be selected as a candidate object. An abnormal object determining apparatus determines whether the candidate object corresponds to an abnormal object using at least one of a moving direction of the person, a moving speed, a distance from the host vehicle, a pose, a direction of a face, or a height.

For example, the abnormal object determining apparatus determines whether the person is a kid or an adult based on a height of a box indicating the candidate object. The abnormal object determining apparatus estimates the moving direction and the moving speed of the person based on factors such as, for example, the direction of the face and the pose of the person.

In an example of FIG. 6, the abnormal object determining apparatus determines that a first candidate object 620 is an adult walking to the right. The abnormal object determining apparatus determines that a second candidate object 630 is a kid running to the left. The abnormal object determining apparatus determines that a third candidate object 640 is an adult riding a bicycle and moving to the right. The abnormal object determining apparatus determines whether each of the first candidate object 620, the second candidate object 630, and the third candidate object 640 corresponds to an abnormal object based on the aforementioned determination results.

Figure 7:
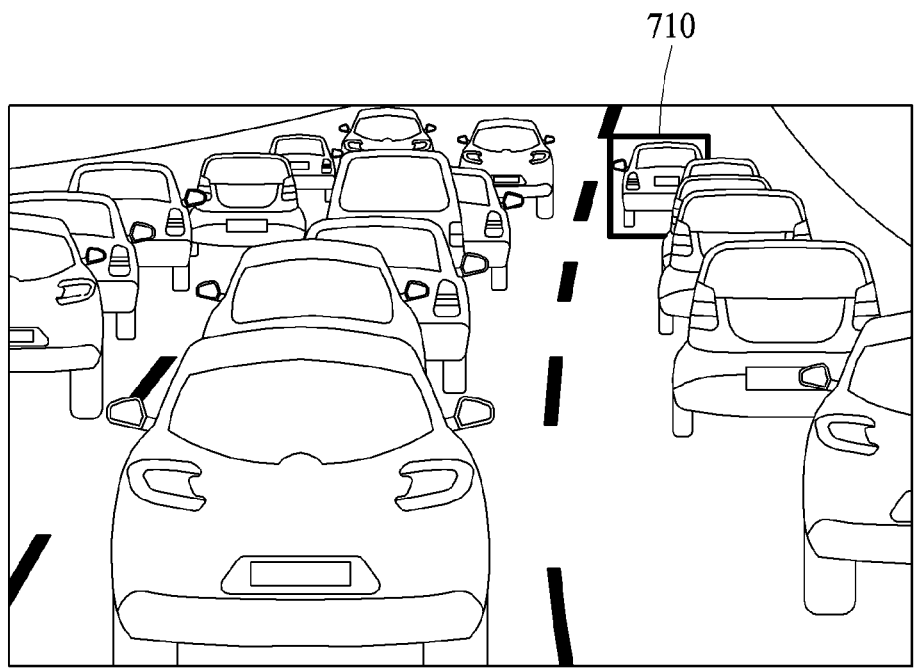
FIG. 7 illustrates an example of outputting an abnormal object.

FIG. 7 illustrates an example of outputting an abnormal object. FIG. 7 illustrates an example of outputting an object 710 determined to be an abnormal object.

In response to a determination that a specific candidate object corresponds to an abnormal object, an abnormal object determining apparatus outputs the abnormal object by methods such as, for example, displaying the abnormal object on a display, replaying a warning sound indicating a presence of the abnormal object through a speaker, provides the warning using tactile information delivered by a steering handle of the vehicle, or a vibration of a passenger seat, or delivering information on the abnormal object to a driving system that controls or guides a driving of the host vehicle. The displayed is described in further details with reference to FIG. 8.

In an example, the warning sound is a sound indicating that the abnormal object is present in front of the host vehicle, or a sound including information illustrating the abnormal object such that a user of the host vehicle recognizes the abnormal object.

In an example, the driving system is an autonomous driving system for controlling the driving of the host vehicle or a navigation system for guiding the driving of the host vehicle. The driving system may be included in the host vehicle or located outside the host vehicle. The driving system may be connected to the host vehicle through a wireless communication.

Figure 8:
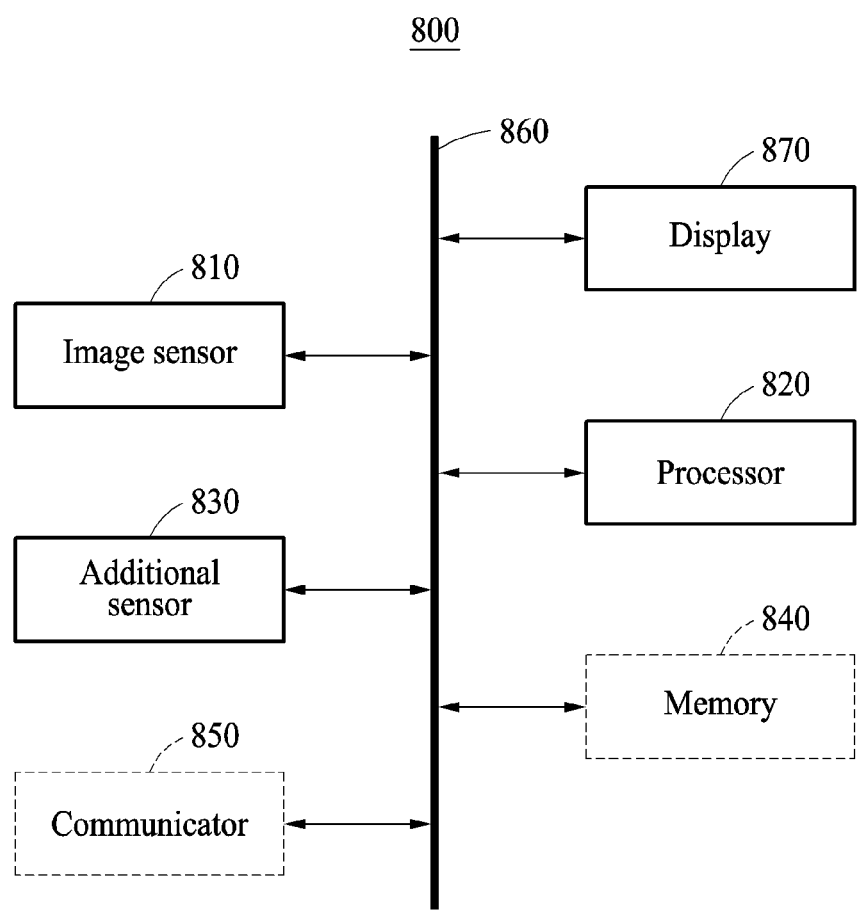
FIG. 8 illustrates an example of an apparatus for determining an abnormal object.

FIG. 8 illustrates an example of an apparatus for determining an abnormal object. Referring to FIG. 8, an apparatus 800 for determining an abnormal object includes an image sensor 810, display 870, and a processor 820. In an example, the apparatus 800 includes an additional sensor 830, a memory 840, and a communicator 850. The image sensor 810, the processor 820, the additional sensor 830, the memory 840, the communicator 850, and display exchange data with one another via a bus 860. In addition to the description of FIG. 8 below, the above descriptions of FIGS. 1-7 are also applicable to FIG. 8, and are incorporated herein by reference. Thus, the above description may not be repeated here.

The image sensor 810 captures a front view of a host vehicle to acquire a 2D image. The image sensor 810 includes, for example, a camera, a complementary metal-oxide-semiconductor (CMOS) image sensor (CIS), a dynamic vision sensor (DVS), and a radar sensor.

The processor 820 determines whether an abnormal object is present in the 2D image received from the image sensor 810. The processor 820 selects a candidate object that may interfere with a driving of the host vehicle from target objects extracted from the 2D image. The processor 820 estimates 3D information on the candidate object and generates a 3D model of the candidate object. The processor 820 determines whether the candidate object corresponds to the abnormal object that interferes with the driving of the host vehicle based on the 3D model. In response to a determination that the candidate object corresponds to the abnormal object, the processor 820 outputs the abnormal object.

The processor 820 selects the candidate object from the target objects using a neural network trained to output the candidate object in response to an input of the 2D image. In an example, the neural network may be trained before the neural network is applied to the apparatus 800. In an example, after the neural network is applied to the apparatus 800, a fine tuning may be performed on the neural network based on a 2D image acquired from the apparatus 800.

An adaptive learning may be applied to the neural network. For example, the processor 820 adaptively trains the neural network using a result of a determination of whether the candidate object corresponds to the abnormal object as a true label. In an example, the processor 820 applies the adaptive learning to an output part, for example, an output layer and a portion of an intermediate layer adjacent to the output layer of the neural network.

When a sequential 2D image is used to determine the abnormal object, for example, when a current 2D image includes a target object determined as a normal object although the target object is determined as the abnormal object in a previously-captured image, the processor 820 adaptively trains the neural network based on the previously-captured image, the current 2D image, and a result of determination of whether the target object is the abnormal object as learning data.

The processor 820 applies the adaptive learning to the neural network determining whether the candidate object corresponds to the abnormal object that interferes with the driving of the host vehicle based on the 3D model. Further details regarding the processor 820 are provided below.

The additional sensor 830 senses information for estimating 3D information used to generate the 3D model of the candidate object. The additional sensor 830 includes, for example, a lidar sensor and a separate additional image sensor differing from the image sensor 810.

When the additional sensor 830 is spaced apart at a distance from the image sensor 810, the apparatus 800 estimates the 3D information by calculating a depth value using 2D images acquired from the image sensor 810 and the additional sensor 830 as a stereo image.

When the additional sensor 830 is the lidar sensor, the apparatus 800 estimates the 3D information using a 3D raw value output by the lidar sensor.

The memory 840 stores information received via the bus 860. Operations of the apparatus 800 may each be stored in the memory 840 in a form of an executable object file or an execution file. Further details regarding the memory 840 are provided below.

In an example, the communicator 850 delivers the information received via the bus 860 to a separate device through a wired or wireless network. For example, the communicator 850 delivers information on the abnormal object determined by the processor 820 to a display, a speaker, or a driving system in the host vehicle or a nearby vehicle.

The display displays the abnormal object or displays an indicator, for example, a colored box indicating the abnormal object with a 2D image of a front view captured from the host vehicle. In an example, the display 870 may be a physical structure that includes one or more hardware components that provide the ability to render a user interface and/or receive user input. The display 870 can encompass any combination of display region, gesture capture region, a touch sensitive display, and/or a configurable area. In an example, the display can be embedded in the apparatus 800 for determining an abnormal object. In an example, the display 870 is an external peripheral device that may be attached to and detached from the apparatus 800 for determining an abnormal object. The display 870 may be a single-screen or a multi-screen display. A single physical screen can include multiple displays that are managed as separate logical displays permitting different content to be displayed on separate displays although part of the same physical screen. The display 870 may also be implemented as an eye glass display (EGD), which includes one-eyed glass or two-eyed glasses. In an example, the display 870 is a head-up display (HUD), a vehicular infotainment system, or a screen in the vehicle that used augmented reality.

Figure 9:
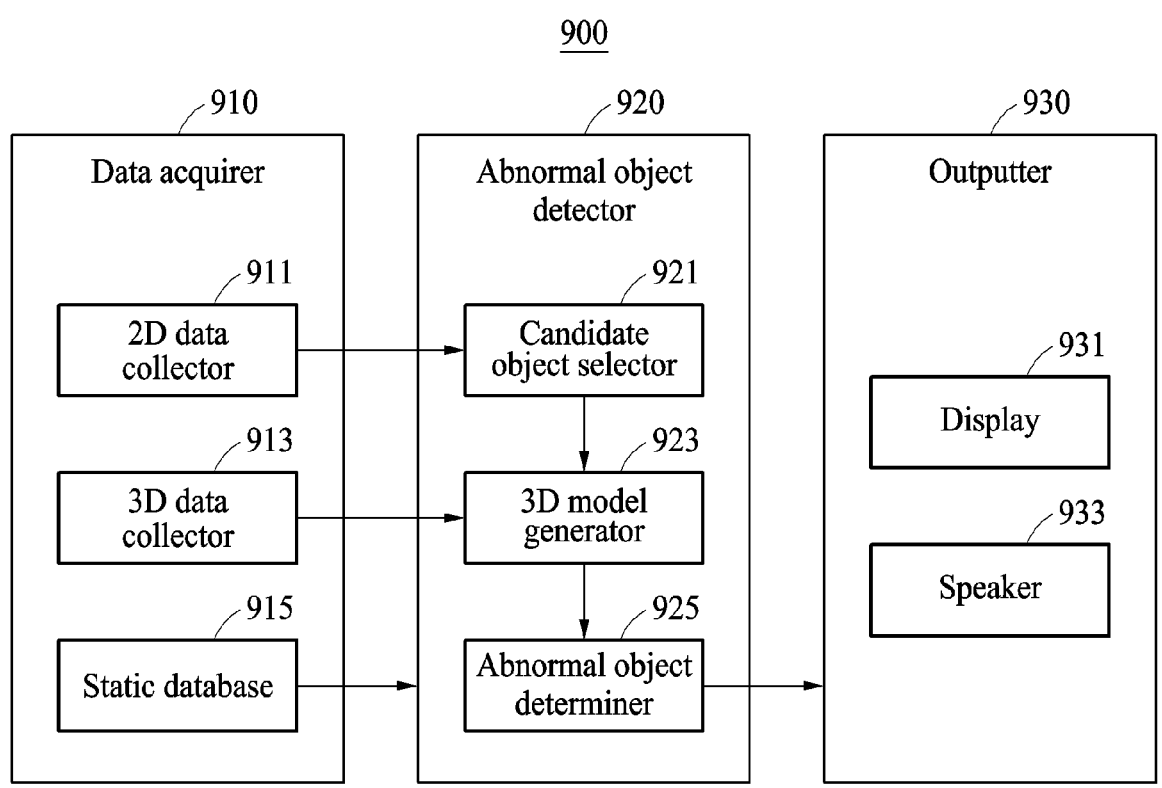
FIG. 9 illustrates an example of an apparatus for determining an abnormal object.

FIG. 9 illustrates an example of an apparatus for determining an abnormal object. In addition to the description of FIG. 9 below, the above descriptions of FIGS. 1-8 are also applicable to FIG. 9, and are incorporated herein by reference. Thus, the above description may not be repeated here.

Referring to FIG. 9, an apparatus 900 for determining an abnormal object includes a data acquirer 910, an abnormal object detector 920, and an outputter 930.

The data acquirer 910 includes a 2D data collector 911, a 3D data collector 913, and a static database 915.

The 2D data collector 911 collects a 2D image of a front view captured form a host vehicle and manages the 2D image. The 2D data collector 911 includes, for example, a CIS, a DVS, and a radar sensor.

The 3D data collector 913 collects or manages information for estimating 3D information used to build a 3D model of a candidate object. The 3D data collector 913 collects or manages a depth value estimated from, for example, a stereo or multi CIS, a stereo or multi DVS, and a lidar sensor.

The static database 915 stores and manages data collected during a driving of the host vehicle, for example, information on the host vehicle, a driving pattern of a user of the host vehicle, a map, and a previous accident frequency.

The abnormal object detector 920 includes a candidate object selector 921, a 3D model generator 923, and an abnormal object determiner 925.

The candidate object selector 921 selects a candidate object from target objects extracted from a 2D image. In this example, the 2D image may be received from the 2D data collector 911.

The 3D model generator 923 generates a 3D model of the candidate object based on 3D information on the candidate object selected by the candidate object selector 921. In this example, the 3D information may be received from the 3D data collector 913.

The abnormal object determiner 925 determines whether the candidate object corresponds to an abnormal object that interferes the driving of the host vehicle based on the 3D model. Information on the abnormal object determined by the abnormal object determiner 925 is provided to the outputter 930.

In an example, the outputter 930 includes a display 931 and a speaker 933.

The display 931 displays the abnormal object determined by the abnormal object determiner 925. In addition to the description of display 931 below, the above descriptions of display 870 are also applicable to FIG. 9, and are incorporated herein by reference. Thus, the above description may not be repeated here. The display 931 displays the abnormal object or displays an indicator indicating the abnormal object with the 2D image of the front view captured from the host vehicle.

The speaker 933 replays a warning sound indicating that the abnormal object is present through a speaker device included in the host vehicle. The warning sound may be a sound indicating that the abnormal object is present in front of the host vehicle, or a sound including information illustrating the abnormal object such that a user of the host vehicle recognizes the abnormal object.

In an example, information on the abnormal object is delivered to a driving system that controls or guides the driving of the host vehicle. In an example, the outputter provides the warning on the abnormal object using tactile information delivered by a steering handle of the vehicle, or a vibration of a passenger seat.

According to aspects, it is possible to selectively build a 3D model for a candidate object that may interfere with a driving of a host vehicle among target objects extracted from a 2D image and determine whether the candidate object corresponds to an abnormal object, thereby reducing an amount of operations, an amount of operation time, and energy consumption.

According to aspects, it is possible to select a candidate object using a 2D image and determine whether the candidate object corresponds to the abnormal object by building a 3D model for the candidate object, thereby detecting the abnormal object with high accuracy.

According to aspects, it is possible to reduce an error in detection of an abnormal object using a degree of curve of a lane, a distance from a host vehicle, a type of a nearby vehicle, a moving direction, and a moving speed as well as a 2D image or 3D information.

The methods and apparatuses disclosed above are applicable to a system of sensing an abnormality from, for example, a closed-circuit television (CCTV) to determine an abnormal object.

The apparatus 800 for determining an abnormal object, apparatus 900 for determining an abnormal object, data acquirer 910, abnormal object detector 920, outputter 930, candidate object selector 921, 3D model generator 923, abnormal object determiner 925, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining an abnormal object, the method comprising:
    selecting a candidate object from target objects extracted from a two-dimensional (2D) image of a front view captured from a host vehicle;
    estimating a three-dimensional (3D) information of the candidate object from the 2D image;
    generating a 3D model based on the estimated 3D information;
    determining, based on the 3D model, whether the candidate object corresponds to an abnormal object that interferes with driving of the host vehicle; and
    outputting the abnormal object, in response to the candidate object corresponding to the abnormal object,
    wherein the selecting the candidate object comprises selecting a first target object from among the target objects as the candidate object in response to a difference being greater than or equal to a threshold, the difference being between a size of a portion of the first target object not occluded by another vehicle in the 2D image to be used to generate the 3D model and a size of a portion of a second target object of the target objects that is not occluded by another vehicles in the 2D image to be used to generate the 3D model.

2. The method of claim 1, wherein the selecting of the candidate object comprises selecting the candidate object from the target objects based on any one or any combination of any two or more of a degree of curve of a lane, a distance from the host vehicle, and types of nearby vehicles.

3. The method of claim 1, wherein the selecting of the candidate object comprises selecting the candidate object from the target objects using a neural network trained to output a candidate object in response to an input of the 2D image.

4. The method of claim 3, wherein the neural network is adaptively trained based the determining of whether the candidate object corresponds to the abnormal object.

5. The method of claim 1, wherein the selecting of the candidate object comprises selecting the candidate object from the target objects based on an abnormal score from a previous image captured earlier than the 2D image, and
    the abnormal score determines whether a target object corresponds to the abnormal object.

6. The method of claim 1, wherein the selecting of the candidate object comprises selecting the candidate object from the target objects based on driving patterns of the target objects acquired from the 2D image and a previous image captured earlier than the 2D image.

7. The method of claim 1, wherein the determining of whether the candidate object corresponds to the abnormal object comprises determining whether the candidate object corresponds to the abnormal object based on any one or any combination of any two or more of whether the candidate object is travelling in a lane identical or adjacent to that of the host vehicle, a moving direction, a moving speed, a distance from the host vehicle, and a size of the candidate object.

8. The method of claim 7, wherein the determining of whether the candidate object corresponds to the abnormal object comprises determining whether the candidate object corresponds to the abnormal object based any one or any combination of any two or more of a shape of a road on which the host vehicle is travelling, a traffic accident frequency, a traffic condition, and a driving pattern of a user of the host vehicle.

9. The method of claim 1, wherein, in response to the candidate object being a person, the determining of whether the candidate object corresponds to the abnormal object comprises determining whether the candidate object corresponds to the abnormal object using any one or any combination of any two or more of a moving direction, a moving speed, a distance from the host vehicle, a pose, a direction of a face, and a height of the person.

10. The method of claim 1, wherein the outputting of the abnormal object comprises any one or any combination of any two or more of displaying the abnormal object on a display device in the host vehicle, replaying a warning sound indicating a presence of the abnormal object through a speaker device in the host vehicle, delivering tactile feedback on the abnormal object by a steering handle of the host vehicle, delivering information on the abnormal object by a vibration of a seat of the host vehicle, and providing the abnormal object to a driving system that controls or guides the driving of the host vehicle.

11. The method of claim 1, wherein the selecting of the candidate object comprises selecting a target object travelling in a pattern different than remaining target objects.

12. A non-transitory computer-readable medium storing instructions that, when executed by a processor, causes the processor to perform the method of claim 1.

13. An apparatus for determining an abnormal object, the apparatus comprising:
    an image sensor configured to capture a front image from a host vehicle and to generate a two-dimensional (2D) image; and
    a processor configured to
        select a candidate object from target objects extracted from the 2D image,
        estimate a 3D information of the candidate object from the 2D image,
        generate a 3D model based on the estimated 3D information,
        determine, based on the 3D model, whether the candidate object corresponds to an abnormal object that interferes with driving of the host vehicle, and
        output the abnormal object, in response to the candidate object corresponding to the abnormal object,
    wherein the processor is further configured to select a first target object from among the target objects as the candidate object in response to a difference being greater than or equal to a threshold, the difference being between a size of a portion of the first target object not occluded by another vehicle in the 2D image to be used to generate the 3D model and a size of a portion of a second target object of the target objects that is not occluded by another vehicles in the 2D image to be used to generate the 3D model.

14. The apparatus of claim 13, wherein the processor is further configured to select the candidate object from the target objects using a neural network trained to output a candidate object in response to an input of the 2D image.

15. The apparatus of claim 14, wherein the neural network is adaptively trained based a determination of whether the candidate object corresponds to the abnormal object.

16. The apparatus of claim 13, wherein the processor is further configured to select the candidate object from the target objects based on an abnormal score from a previous image captured earlier than the 2D image, and the abnormal score determines whether a target object corresponds to the abnormal object.

17. The apparatus of claim 13, wherein the processor is further configured to determine whether the candidate object corresponds to the abnormal object based on any one or any combination of any two or more of whether the candidate object is travelling in a lane identical or adjacent to that of the host vehicle, a moving direction, a moving speed, a distance from the host vehicle, and a size of the candidate object.

18. The apparatus of claim 17, wherein the processor is further configured to determine whether the candidate object corresponds to the abnormal object based on any one or any combination of any two or more of a shape of a road on which the host vehicle is travelling, a traffic accident frequency, a traffic condition, and a driving pattern of a user of the host vehicle.

* * * * *